United States Patent [19]

Cmolik

[11] 3,967,340
[45] July 6, 1976

[54] WINDSHIELD WIPER PRESSURE DISTRIBUTION BLOCK

[75] Inventor: Charles F. Cmolik, Berwyn, Ill.

[73] Assignee: Lawrence Peska Associates, Inc., New York, N.Y. ; a part interest

[22] Filed: Oct. 1, 1975

[21] Appl. No.: 618,320

[52] U.S. Cl............................ 15/250.42; 15/250.2
[51] Int. Cl.² ........................................... B60S 1/02
[58] Field of Search........... 15/250.1, 250.2, 250.36, 15/250.42

[56] References Cited
UNITED STATES PATENTS

| | | | |
|---|---|---|---|
| 3,128,491 | 4/1964 | Reese | 15/250.42 |
| 3,177,514 | 4/1965 | Wise | 15/250.42 |
| 3,419,932 | 1/1969 | Linker | 15/250.42 X |

FOREIGN PATENTS OR APPLICATIONS

| | | | |
|---|---|---|---|
| 655,541 | 7/1963 | Italy | 15/250.42 |

*Primary Examiner*—Peter Feldman
*Attorney, Agent, or Firm*—Jack D. Slobod

[57] ABSTRACT

A resilient elongated block adapted to be wedged between the back side of a windshield wiper blade and the arcuate holding arm for the blade at the centers thereof has a locating groove for transverse engagement about the back side of the blade and integral tie straps for fastening about the holding arm. The block provides an increase in pressure of the center of the blade against a windshield.

3 Claims, 3 Drawing Figures

WINDSHIELD WIPER PRESSURE DISTRIBUTION BLOCK

FIELD OF THE INVENTION

The present invention relates to devices for controlling the pressure pattern of a windshield wiper blade on a windshield. In its particular aspects, the present invention relates to a block adapted to be secured in wedging relationship between a windshield wiper blade and a holding arm for the blade.

BACKGROUND OF THE INVENTION

Since windshield wiper blades are generally supported in arcuate holding arm at the opposite ends of the blade, frequently there is insufficient blade pressure at the center thereof. Consequently, streaks are produced along the path traced by the center of the blade along the windshield. Such streaks obstruct the view of the road since they generally occur at eye level.

While various windshield wiper blades are known in the prior art for flexing a blade in an attempt to conform to the shape of a windshield, basically, with modern curved auto windshields, the curve of the windshield varies considerably along the path of the blade making conformance thereto quite difficult.

While devices such as illustrated in U.S. Pat. No. 2,658,223 to Enochian have been known for applying pressure to the center of a windshield wiper blade, such devices being configured to be built into the windshield wiper holder are not available for use with existing conventional windshield wiper holders.

OBJECTS OF THE INVENTION

It is an object of the present invention to provide a device for increasing the pressure at the center of a blade on a windshield.

It is a further object of the present invention to provide a device for influencing the pressure pattern of a windshield wiper, which device is simple, inexpensive and which may be installed on existing windshield wipers.

It is yet another object of the present invention to provide a device for influencing the pressure pattern of a windshield wiper blade in a manner for enabling the blade to conform to the varying windshield contours encountered along the path of the blade.

SUMMARY OF THE INVENTION

Briefly, the aforementioned and other objects of the present invention are satisfied by providing an elongated block of material which is dimensioned to be wedged between the rear side of the wiper blade and the arcuate holding arm therefor to redistribute some of the force normally applied to the ends of the blade by the holder to the center of the blade.

The block is secured in place by two sets of integral tie straps which are fastened over the holder arm. Further, the block is located in place by an elongated groove of a width for engagement about the back side of the wiper blade.

To permit the blade to conform to the varying contours of the windshield, the block is composed of a resilient material.

Other objects, features, and advantages of the present invention will become apparent upon perusal of the following detailed description of the preferred embodiment thereof when taken in conjunction with the appended drawing wherein.

DETAILED DESCRIPTION

Figure 1:
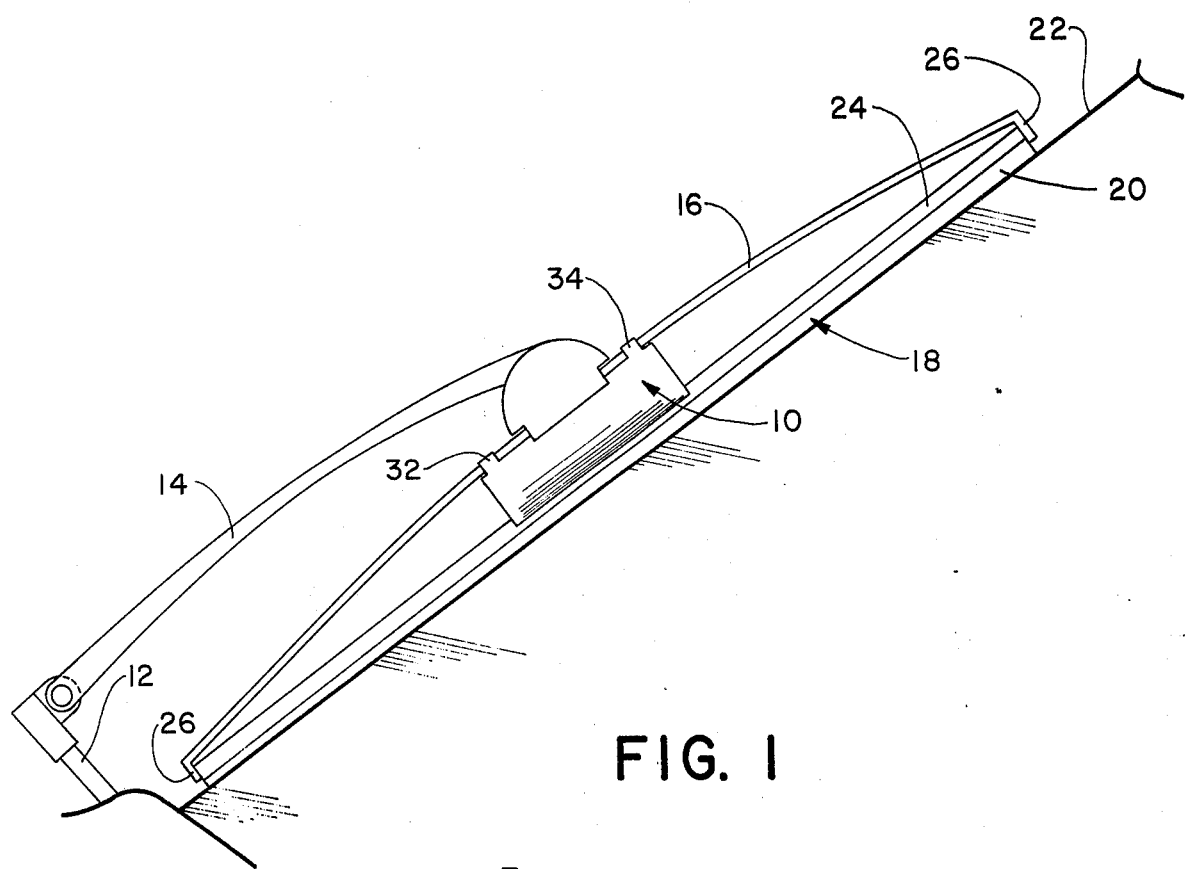
FIG. 1 is a side elevation of the pressure distribution block of the present invention installed on a windshield wiper assembly.

Referring first to FIG. 1 of the drawing the pressure distribution block 10 of the present invention is shown installed in a conventional windshield wiper assembly which includes the motor driven shaft 12, connected to a spring biased arm 14 which is secured to a holder arm 16 for a windshield wiper blade or squeegee 18 at the center of holder arm 16. Squeegee 18 includes the usual narrow elongated rubber blade member 20, bearing on windshield 22, which projects from an elongated backing strip portion 24.

As is conventional, strip portion 24 generally has a captured elongated sheet metal strip (not shown) to permit the squeegee to flex into a smooth longitudinal curve in an attempt to enable conformance with windshield 22. The squeegee 18 is carried by tabs 26 on opposite ends of the holder arm which generally provide pressure primarily at the opposite ends of squeegee 18.

In accordance with the principles of the present invention the elongated generally rectangular block 10 is wedged between the center of holder arm 16 and the center of backing strip portion 24 to redistribute to the center of squeegee 18, some of the force applied to the opposite ends of the squeegee by holder arm 16.

Figure 2:
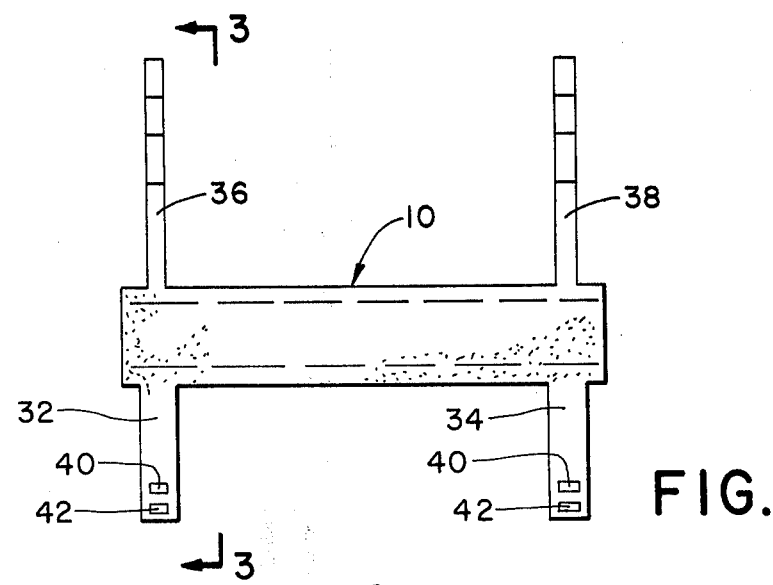
FIG. 2 is a top view of the block of FIG. 1 prior to installation.
Figure 3:
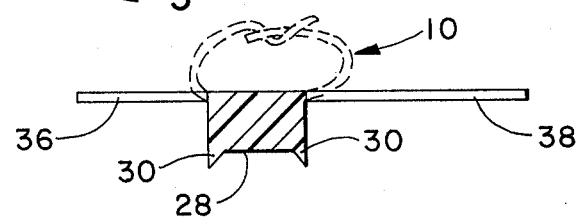
FIG. 3 is a cross-sectional end view of the block along the lines 3—3 in FIG. 2.

Now, also referring to FIGS. 2 and 3, the block 10 is preferably about 3¼ inches in length and sets approximately a ⅜ inch spacing between the centers of the arm 16 and backing portion 24.

For enabling installation of block 10 in existing windshield wiper assemblies, the bottom side of the block is provided with a longitudinally directed groove 28 which is approximately three eighths of an inch in width to permit transverse engagement about backing portion 24. To facilitate installation, the longitudinally directed protrusions 30 on opposite sides of groove 28 are configured to define a tapered mouth for the groove. As is apparent, the groove 28 locates the block transversely with respect to squeegee 18.

To permit block 10 to be secured in place a pair of apertured broad straps 32 and 34 are provided projecting integrally from one side of block 10, and a pair of narrow straps 36 and 38 are provided projecting integrally from the opposite side in register with the broad straps. As is apparent from the drawing, the aforementioned straps are provided near opposite ends of block 10 for fastening about holder arm 16. A series of two apertures 40 and 42 are provided in each of the broad straps 34 to enable a locking action when the corresponding narrow straps are threaded serially down through aperture 40 and up through aperture 42.

The block 10 is preferably composed of a resilient rubber or plastic material to permit the squeegee 18 to flex while increasing pressure in the center of the squeegee.

Having described the preferred embodiment of the present invention in specific detail, it should be understood that numerous modifications, additions and omissions in the details thereof are possible within the intended spirit and scope of the invention.

What is claimed is:

1. A device for distributing the pressure applied to an elongated windshield wiper squeegee, having a blade portion projecting from a backing portion, by an arcuate holder arm carrying opposite ends of the squeegee comprising a block dimensioned to be wedged between the centers of the holder arm and the backing portion of the squeegee, groove means in said block dimensioned for engagement about the backing portion, and tie means carried by said block, for fastening about said holder arm.

2. The device of claim 1 wherein said block is composed of a resilient material.

3. The device of claim 1 wherein said block is a generally rectangular elongated block and wherein said tie means comprises straps projecting integrally from opposite sides of said block.

* * * * *